March 22, 1938.  J. MOZONCHAK  2,111,673
INCLINOMETER
Filed March 29, 1937      2 Sheets-Sheet 1

Inventor
John Mozonchak
By Clarence A. O'Brien
Hyman Berman
Attorneys

March 22, 1938.  J. MOZONCHAK  2,111,673
INCLINOMETER
Filed March 29, 1937   2 Sheets-Sheet 2
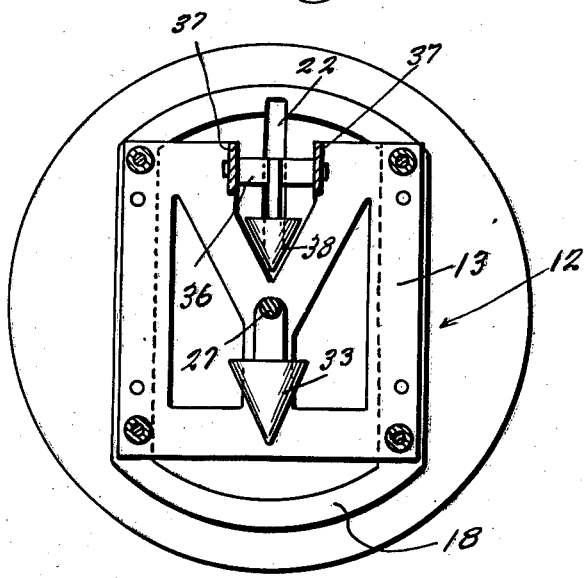
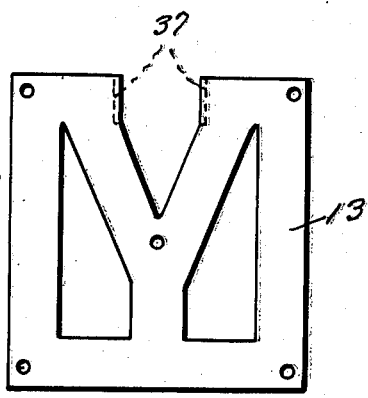
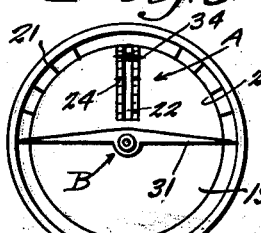
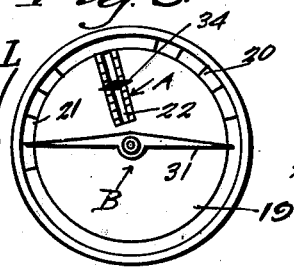
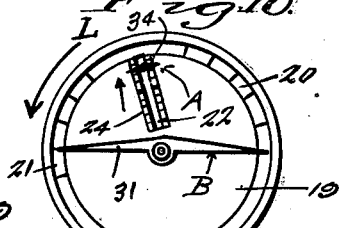
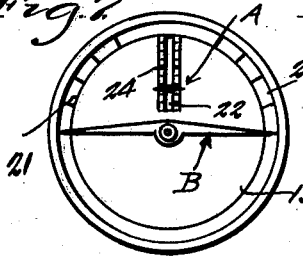
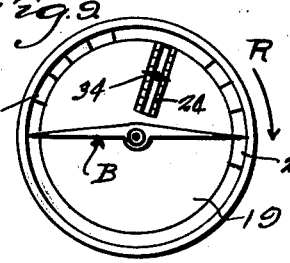
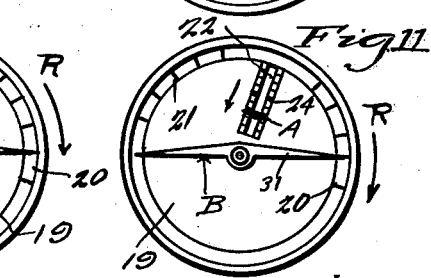
Inventor
John Mozonchak
By Clarence A. O'Brien
Hyman Berman
Attorneys Patented Mar. 22, 1938

2,111,673

UNITED STATES PATENT OFFICE 2,111,673

INCLINOMETER

John Mozonchak, Olyphant, Pa.

Application March 29, 1937, Serial No. 133,683

1 Claim. (Cl. 33—215)

The present invention relates to a dual inclinometer of a type having a definite two-fold purpose adapting it for adequate and reliable use on the instrument panel of an airplane or equivalent conveyance, and the general purpose of the invention is to provide in a single instrument two-way indicating means to definitely aid flying under abnormal weather conditions when poor visibility prevails.

As implied by the preceding introductory general statement of the invention, aviators are in no position to depend upon a sense of balance in ascertaining whether the ship is ascending, descending, or banking into a turn. I have therefore discovered the need for the provision of what may be conveniently called a double-acting unitary instrument at all times available to enable the aviator to detect at a glance directional movements of the plane.

Stated otherwise, the device herein shown and particularly described affords reliable means enabling the pilot to quickly detect when the plane is climbing, diving, or either wing of the plane is inclined below a predetermined horizontal line causing him to unwittingly and unknowingly throw the ship off of its course. This I do through the instrumentality of a simple and economical duplex instrument having properly located and coordinated mechanically actuated visible indicators.

Needless to say, I am sufficiently conversant with the prior state of the art to which the invention relates to appreciate that a so-called inclinometer is not broadly new. It follows, therefore, that my primary aim is to combine into a single instrument two independently operable, yet companion indicators, each of which contributes its proportionate share in enabling the pilot to focus his eye thereon and to immediately detect hazardous conditions.

Other features and advantages will become more readily apparent from the following description and accompanying illustrative drawings.

In the accompanying drawings, wherein like numerals are employed to designate corresponding mechanical elements or parts throughout the views:

Figure 3 is a section on the line 3—3 of Figure 2.

Figure 4 is a detail view of one of the plate members of the mechanism accommodation or mounting frame.

Figures 6, 7, 8, 9, 10, and 11 are diagrammatic views illustrating the principle of operation to enable one to better appreciate the features and advantages of the invention.

Figure 1:
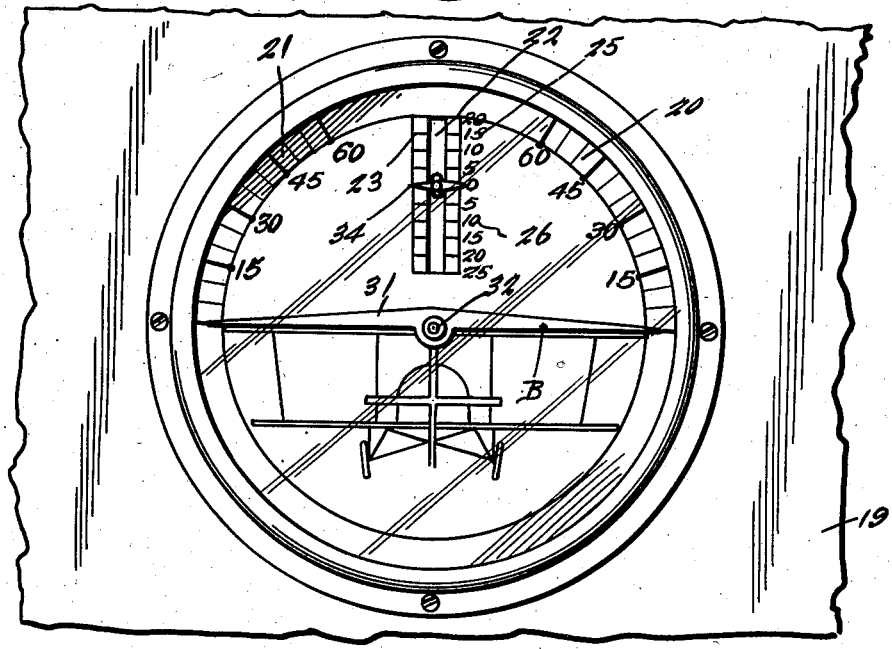
Figure 1 is a front elevation of an instrument board provided with a dial-type instrument constructed in accordance with the specific provisions of this invention.
Figure 2:
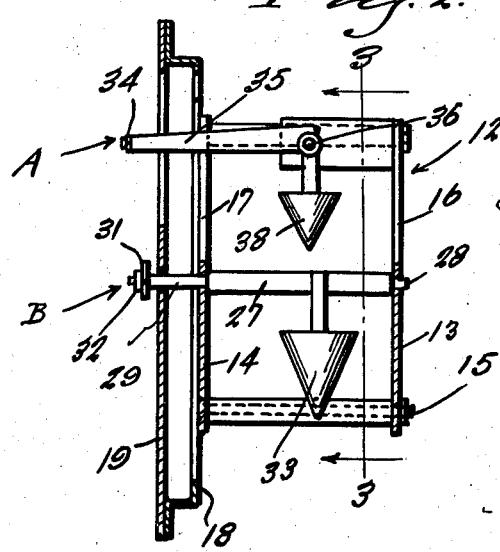
Figure 2 is what may be called a central vertical sectional view through the device removed from the instrument board.
Figure 5:
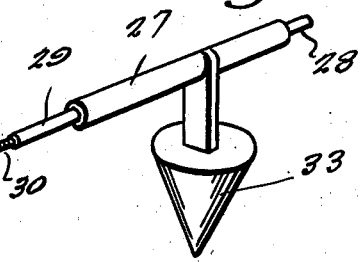
Figure 5 is a perspective detail view of one of the counterweighted shafts or axles.

As a matter of convenience, I direct attention first to the general assembly illustrated to advantage in Figure 2. Here the mechanism accommodation frame is denoted generally by the numeral 12. It comprises a pair of spaced parallel substantially duplicate plates 13 and 14 bolted together, as indicated at 15, by suitable spacing and assembling means. Although the two plates 13 and 14 are of open work design, the preferred embodiment of the invention plans the use of plates having aligned V-shaped notches 16 and 17 therein, as illustrated. The plate 14 is attached to what may be called an adapter 18 to facilitate attachment to the instrument board, as disclosed in Figure 1. The adapter is connected with a circular dial 19. The dial as depicted in Figure 1, has a marginal scale arrangement. There is a scale 20 on one side and a similar scale 21 on the other side, these two scales being suitably graduated and marked with legible numerals. Between the two segmental scales 20 and 21 the dial is provided with a slot 22 whose marginal edges are formed with graduations 23. At the transverse center of the graduations 23 are the markings which may be called the median characters, as indicated by the numeral 24 in Figure 6. Above and below the median lines 24 are distinguishable scales properly graduated and differentiated by the numerals 25 and 26, respectively. The upper scale 25 is used to indicate "climbing", and the lower scale 26 to indicate "diving". Or stated otherwise, these two scales serve to facilitate determination of ascending and descending inclination.

The characters A and B designate distinguishable indicating devices concurrently cooperable with the respective scales 20, 21, and 25 and 26. The indicator B is characterized by an oscillatory rocker shaft or axle 27. The journals 28 and 29 at opposite ends are mounted in appropriate bearings. The journal 29 terminates in a threaded extension 30 to accommodate the double-pointer member 31 removably held in place by retaining nuts 32. This pointer is maintained in a normal horizontal plane at right angles to the perpendicular by the pendulous weight or plumb-bob 33 carried by and depending from the central portion of the rocker shaft 27. The shaft 27 is suitably mounted in bearings in the plates 13 and 14.

The relatively small double-ended pointer or indicator 34 at the top is carried on the outer end of an arm 35 operating in the accommodation slot 22. The arm is operatively connected with a rocker shaft 36 mounted in supporting ears 37 on the plate 13. Here again is a counterweight or plumb-bob 38 carried by and depending from the complemental shaft or axle 36. The longitudinal axis of the rocker shaft 27 is thus at right angles to the axis of the shorter companion shaft 36. Thus, the movement of the weights 33 and 38 is correspondingly directed.

The principle of operation will be evident by checking Figures 6 to 11, inclusive. Take, for example, in Figure 6, the indicator B, part 31, shows that the left and right wings are level, but that the plane is climbing. This is determinable from the elevated position of the pointer 34 moving up on the scale 25. The degree of ascension can be approximately determined from the figures in said scale 25. The opposite is true in Figure 7, where we see the indicator 34 disclosing the plane diving or nosing down. This time the indicator is coacting with the scale 26. In Figure 8, we see the indicator 34 at zero, but the plane leaning toward the left, that is, the left wing at a point lower than the right wing. The tilt of the instrument board 19 swings the scale 21 around in relation to the constantly level indicator 31 to disclose the approximate tilt of the left wing. In Figure 9, the right wing is tilting down causing the plane to bank or turn toward the right. Figure 10 illustrates a phase of operation similar to that disclosed in Figure 8, the plane making a left turn while ascending. The reverse is depicted in Figure 11, where a right tilt is indicated, the indicator 34 swinging down in its slot 22 to disclose downward flight.

It is believed that a multiple-purpose, two-way indicator of the type disclosed is, beyond any doubt, a safety feature desirable for use on the instrument board of an airplane or the like. During storms, fog, and other conditions, when the line of flight is not visible to the eye of the pilot, he can depend with confidence on this double-acting dial and two-way pointer assembly to detect the line of flight above or below the intended horizontal altitude and can simultaneously ascertain the relative flight positions of the left and right wings to avoid steering the plane out of its intended straight-ahead course. The simple adoption and use of counterweights and a mounting frame structure therefore with the dial mounted on the instrument board causes the slot 22 itself to assume different angular positions with respect to the constantly level double-ended pointer 31 to coact therewith to disclose at a glance conditions of flight. When the pilot is aware of ascending or descending, and improper levels of the wings, he can reliably promote safe traveling and thus avoid accidents.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a device of the class described a dial having a vertical slot therein with graduations on the dial adjacent the slot, a member connected to the rear face of the dial and having a rearwardly extending offset portion provided with a slot which is in alignment with the first-mentioned slot, a frame including front and rear members spaced apart and means connecting the members together, the front member being connected to the rear face of the offset part and said front and rear members having openings in their upper portions, a pair of spaced ears extending forwardly from the upper side walls of the opening in the rear member, a short shaft having its ends journaled in said ears, an arm connected with the shaft and passing through the opening in the front member and through the slots in the offset part and in the dial, a transverse pointer connected to the front end of said arm, a depending arm connected with the shaft and a weight connected with the lower end of the depending arm.

JOHN MOZONCHAK.